Dec. 6, 1927.
A. WURDACK
1,651,500
PULP PRESS
Filed Oct. 20, 1924
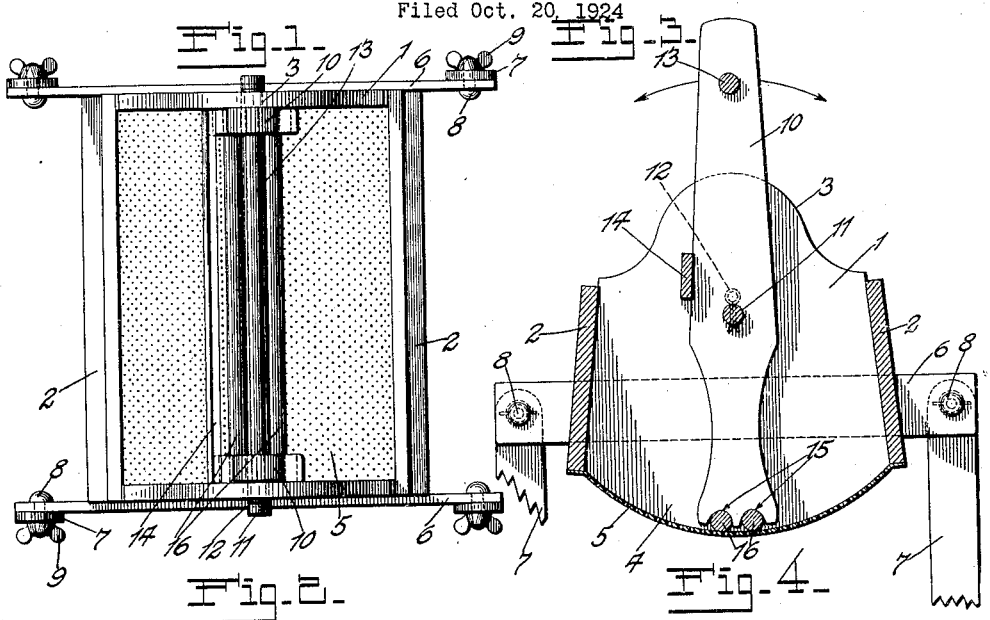
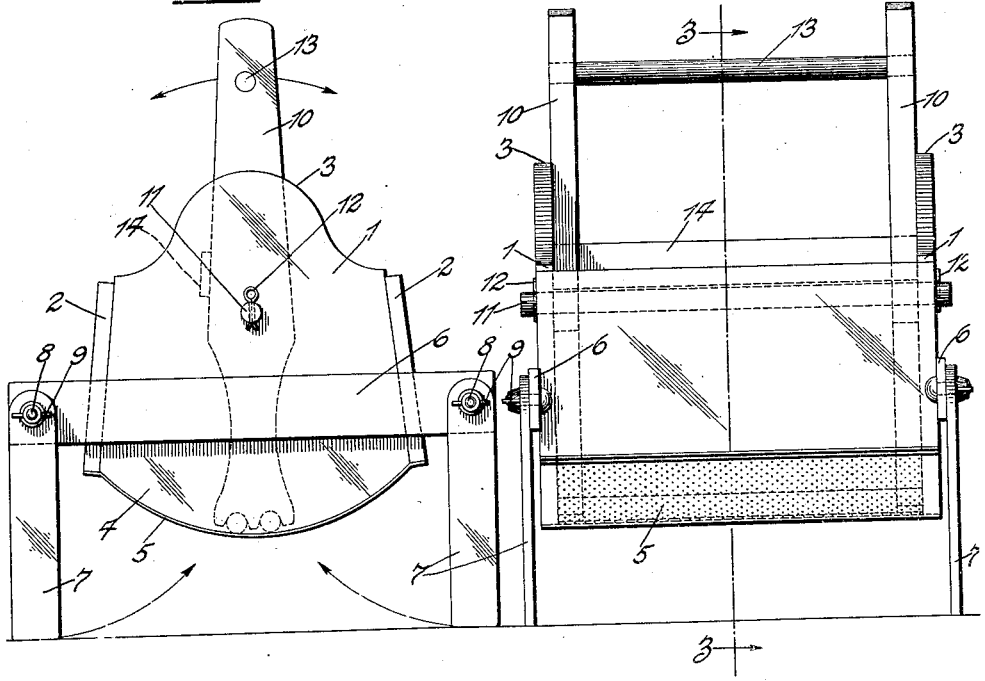
Inventor:
Arthur Wurdack,
by Rippey & Kingsland,
His Attorneys.

Patented Dec. 6, 1927.

1,651,500

UNITED STATES PATENT OFFICE.

ARTHUR WURDACK, OF NORMANDY, MISSOURI.

PULP PRESS.

Application filed October 20, 1924. Serial No. 744,598.

This invention relates to improvements in pulp presses of the type particularly adapted for disintegrating fruits and vegetables.

An object of the invention is to provide a press comprising a container having a reticulated bottom and an oscillating member, whereby a quantity of fruit or vegetables may be disintegrated and the pulp thereof finely divided by pressing the same through the reticulated bottom of the press.

Additional advantages of the invention will be apparent from the following detailed description taken in connection with the accompanying drawing, in which Fig. 1 is a plan view.
Fig. 2 is an end view.
Fig. 3 is a cross section on the line 3—3 of Fig. 4.
Fig. 4 is an end view.

In the embodiment of the invention illustrated in the drawing the container or vat is shown as comprising end walls 1 and side walls 2. The end walls are arranged so that they extend both above and below the edges of the walls 2, being formed with an upper rounded extension 3 and a lower rounded extension 4.

The bottom of the vat or container consists of a segmental reticulated member 5, the edges of which are respectively secured to the rounded portions 4 of the end member 1 and to the lower edge of the side members 2. The supports for the container or vat consists of cross members 6 rigidly secured to the outer surface of the end members 1 and preferably extending beyond the side walls 2. Adjustable legs 7 are pivotally secured to the respective ends of the members 6 by bolts 8 provided with wing nuts 9. These supports provide means whereby the vat or container may be supported above the floor level as best shown in Fig. 2, so that there will be a space below the reticulated bottom of the vat for the reception of a pan or other receptacle for receiving the pulp strained through the bottom wall of the container or vat; or, if desired, the legs 7 may be adjusted to a horizontal position running longitudinally with the cross members 6 by loosening the wing nuts 9, the said legs being held in the upper adjustment by the clamping action of the wing nuts 9 on the bolts. When in this adjustment the extending ends of the cross members constitute supports that may be placed directly on the upper edge of a receptacle, such as barrel or large pan, the lower portion of the vat or container extending into said receptacle.

The oscillating member includes levers 10 pivotally supported upon a cylindrical cross piece 11. The cross piece 11 extends through openings in the end members 1 and is releasably adjustable in the openings so that it may be removed and the oscillating member taken out of the container or vat for cleansing purposes.

To hold the member 11 in place cotter pins 12 are inserted in openings therein beyond the outer surface of the walls 1. The levers 10 are positioned at each end of the container or vat and carry between their upper ends a cylindrical member 13 constituting a handle by which to oscillate. The levers are further secured together and reinforced by a slat 14 secured to one edge thereof slightly above the pivot point. The lower end of each of the levers 10 is formed with parallel recesses 15 in which the ends of rollers 16 are seated. The distance from the base of the recesses 15 to the inner periphery of the reticulated bottom 5 is slightly in excess of the diameter of the rollers 16, so that the rollers as the oscillating member is reciprocated are free to revolve causing a rotary pressing motion against the reticulated bottom for pressing out and disintegrating the fibres of the pulp put in the container or vat.

In the use of the press fruits or vegetables in relatively large pieces may be fed into the vat through the open top and by reciprocating or oscillating them they will be broken up and passed through the reticulated bottom 5, pressing out the juices of the fruits or vegetables and at the same time disintegrating the pulp fibres and pressing them through the reticulated bottom.

The apparatus may be made of any suitable material and the mesh of the bottom 5 may be made of any degree of fineness, depending upon the quality of pulp desired.

I am aware that the invention may be modified in certain particulars without departing from the spirit and scope thereof. I do not limit myself, therefore, to the exact details shown and described, but what I claim and desire to secure by Letters Patent is:—

A press comprising a pair of parallel vertical end walls having upwardly converging side edges, a pair of side walls attached to the side edges of said end walls and extending upwardly in converging planes, a perforated bottom attached to said end walls and to the lower edges of said side walls and being arcuate in end elevation, an endwise removable pivot having its ends extending through said end walls below the plane of the upper edges of said side walls and concentrically with the curvature of said bottom wall, releasable elements engaging said pivot outside said end walls and preventing longitudinal movement of said pivot, and an agitator supported by said pivot.

ARTHUR WURDACK.